Jan. 30, 1962  D. H. JOHNS  3,019,336
METHOD OF AND APPARATUS FOR MEASURING COATING AMOUNTS
Filed June 25, 1956  2 Sheets-Sheet 1

INVENTOR.
DON H. JOHNS
BY Charles H. Erne
Leland R. McCann
George W. Reiber
ATTORNEYS

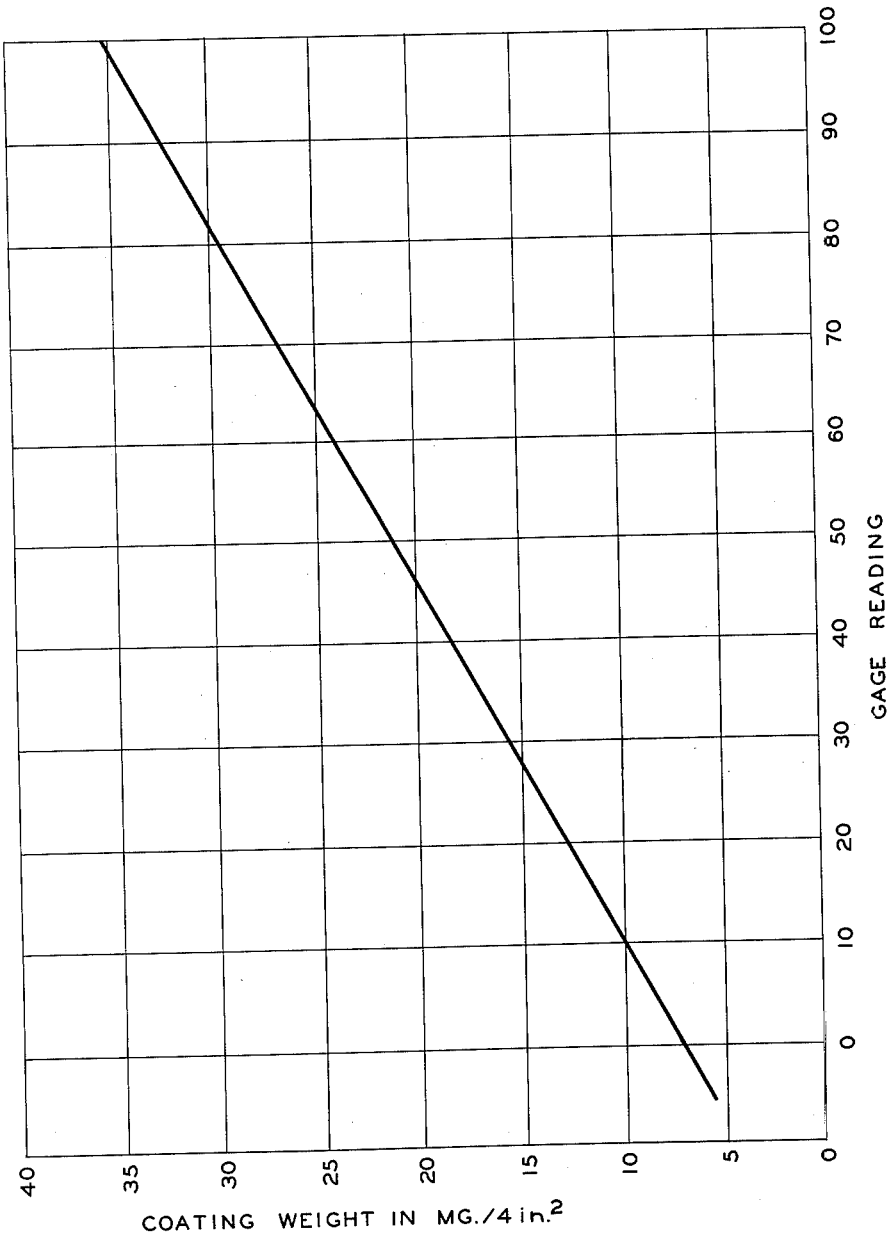

United States Patent Office 3,019,336
Patented Jan. 30, 1962

3,019,336
METHOD OF AND APPARATUS FOR MEASURING COATING AMOUNTS
Don H. Johns, Fox River Grove, Ill., assignor to American Can Company, New York, N.Y., a corporation of New Jersey
Filed June 25, 1956, Ser. No. 593,754
10 Claims. (Cl. 250—43.5)

The present invention relates to a method of and apparatus for measuring the amount of a coating being applied to a metal sheet utilizing some means of radiation. More particularly the present invention relates to a method of and apparatus for measuring the amount of an organic coating being applied to a metal sheet while in the wet state and involving the use of a beta radiation from a radioactive source.

With the growth of the plastic industry, the use of natural and synthetic resins as coating compositions for various materials such as paper and metal, is finding more and more application. One of the most widely known methods of applying such coatings is by passing a web of material to be coated, either continuous or in sheet form, past and in contact with an applicator roller carrying on its surface a thin film in wet form of the coating to be applied. In most instances, especially when coating a metal sheet, this applicator roller is made from a nonmetallic substance such as rubber or gum, and receives its thin film of coating from a metal transfer roller which obtains its supply of wet coating from a suitable reservoir and transfers it to the applicator roll. Since ultimate performance of the coating material depends in large part upon the amount or thickness of coating thereon, it is of prime importance that the amount of coating being applied to the substrate be regulated rather carefully. It is therefore necessary that the amount of coating being applied be known so that adjustments if necessary may be made to regulate the quantity of coating.

In the past, time consuming and tedious methods of measuring the coating weight or thickness have been employed. It was usually necessary to wait until the coating dried to a solid state, and then use a system of weighings and coating removals, either by mechanical, chemical or electrochemical means, to determine the amount of coating on the substrate. An improved and more efficient measuring system whereby the amount of coating being applied to the web could be measured during the application of the wet coating has long been sought.

To be effective, the method and measuring device for effecting the measurement must be non-destructive of and non-contacting with the wet fluid coating. The non-destructive requirement is necessary so that there is no interruption of the coating operation or loss of production. The reason for the non-contacting requirement is obvious; since the coating is in a wet, fluid state, a measuring device requiring contact with this coating would not only mar the coating but would probably be of questionable accuracy.

There are disclosed in the prior art and are commercially available, various devices for measuring thickness which require no contact between the device and the work. Among these devices are those utilizing some form of radiation, e.g. X-rays, atomic radiation. However, with each of these prior art measuring devices, the measurements are taken directly on the material being coated. Attempts to measure film thickness or coating weights on ferrous metal sheets using this teaching of the prior art resulted in failure to obtain satisfactory results. Further experimentation revealed that the failure of this method was due to the presence of isolated, random magnetic fields existing in the ferrous metal sheet.

After extensive experimentation, I discovered and devised a method of and apparatus for determining, during its application, the amount or thickness of a wet film of organic coating applied to a sheet during the time of its application to the sheet. This method and apparatus has the advantage of being applicable to the measurement of coating amounts on all types of sheet materials, regardless of whether or not the coating and sheet material are of the same or similar compositions, e.g. organic coating on paper, or of widely different compositions, e.g. organic coating on a metal sheet.

It is therefore an object of the present invention to provide an apparatus for measuring the amount of wet coating being applied to a continuous web or sheet of material wherein there is no physical contact between the measuring device and the wet coating.

It is a further object of the invention to provide an apparatus of the character described which is continuous and non-destructive and therefore in no way interferes with the coating operation or production.

Another object is to provide an apparatus which measures the amount of wet coating being applied to a web or sheet during the time the wet coating is being applied to the sheet to permit careful and timely control and regulation of the amount of coating being applied to the sheets.

Still another object is to provide a method of rapidly and efficiently measuring the amount of a wet coating being applied to a sheet or web, which method involves no contact between the measuring device and the coating, nor is it destructive of the coating or the web and is continuous and independent of the nature of the substrate web or sheet.

Numerous other objects and advantages of the invention will be apparent as it is better understood from the following description, which, taken in connection with the accompanying drawings, discloses a preferred embodiment thereof.

Referring to the drawings:

FIGURE 2 is a plot of the values obtained in the operation of the present invention.

Figure 1:
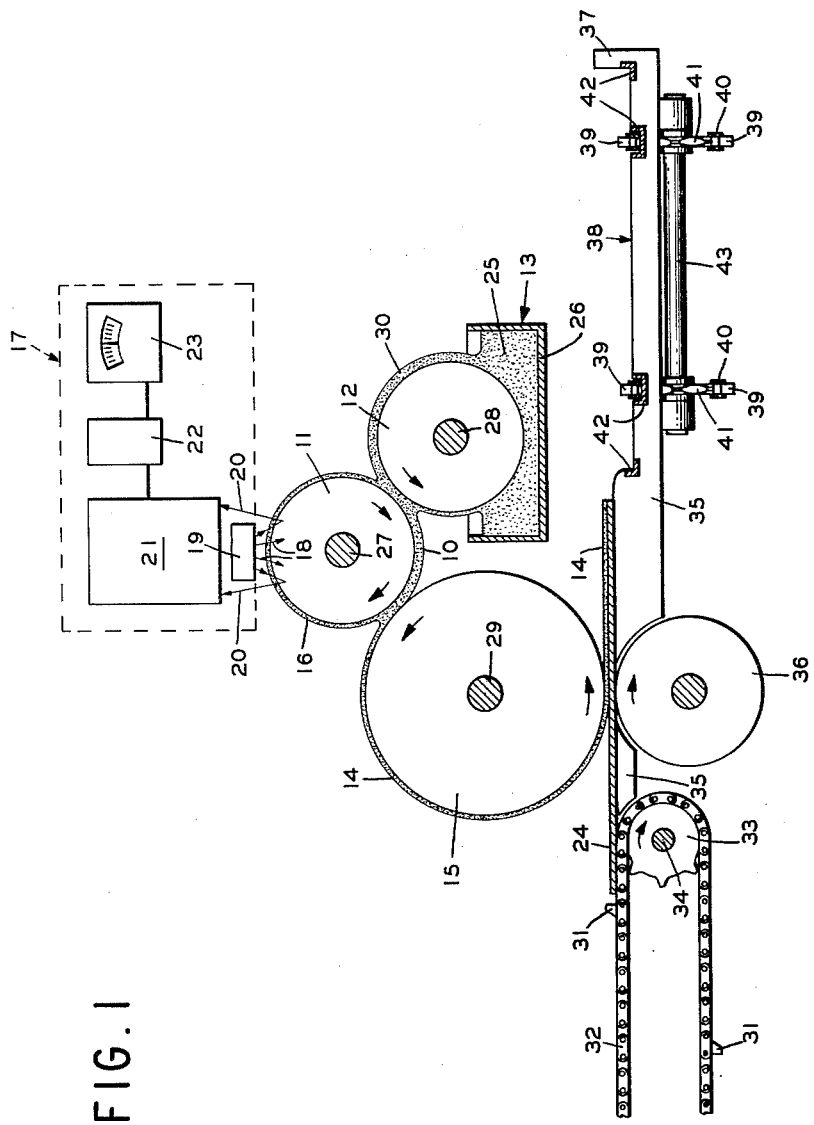
FIGURE 1 is a schematic, side elevational view illustrating the apparatus and method of the present invention, with portions of the apparatus shown in section.

I have discovered that the thickness or amount of a wet coating applied to a sheet or web by means of a commercial roller coating machine can be determined by measuring the thickness or amount of a film of the coating carrier on the peripheral surface of one of the transfer rollers of the coating machine, which measurement is effected by measuring the intensity or quantity of back-scattered or reflected radiation coming from said transfer roller. This discovery affords a quick and accurate determination of the amount of wet coating being applied to the sheet or web as the coating is being applied and requires no physical contact between the measuring device and the wet coating.

The following example of the method of the instant invention is by way of explanation only and is not to be construed as a limitation thereon.

The portions of a commercial roller coating machine pertinent to the present invention are illustrated in the drawing.

A thin film 10 of a wet organic coating is supplied to the surface of a steel transfer roller 11 by any suitable means, such as steel pick-up roller 12 rotating in a bath of liquid coating 13. Roller 12 picks up the coating from bath 13 and by virtue of its contact therewith, transfers a portion of the coating to transfer roller 11.

Roller 11, by virtue of its contact therewith, transfers a portion 14 of film 10 to an applicator roller 15. The portion 16 of film 10 not transferred to roller 15 remains and is carried around on the surface of the steel transfer roller 11.

From a beta gage, generally designated 17, a stream of beta rays 18 emanating from a radioactive source 19, for example strontium 90, contained in the beta gage, are directed toward and through film 16 and into steel roller 11. A portion 20 of beta rays reflected or back-scattered from the steel roller 11 and film 16 are collected in an ionization chamber 21 contained in the beta gage 17. Ionization chamber 21 is shielded from direct radiation from the source 19. The collected back-scattered beta rays 20 generate a small current in the ionization chamber 21 which varies directly with the quantity thereof, which in turn varies inversely with the thickness of the film 16. By means of suitable electrical circuits obvious to one skilled in the art, the generated current is passed from the ionization chamber 21 through a suitable current amplifier 22 to a suitable visual inspection device such as ammeter 23, all contained in the beta gage 17.

When the ammeter 23 gives a substantially constant reading with the rollers 11, 12 and 15 in operation, the reading is noted and a sheet of steel 24 is fed along a predetermined path of travel contiguous the applicator roller 15 whereby at least a portion of the film 14 on roller 15 is deposited on or applied to the surface of sheet 24. Any portion of the film 14 not deposited on sheet 24 is carried around on the surface of rollers 15 until it merges with film 10. The solvent is then removed from film 14 on sheet 24, such as by heating in an oven (not shown) to provide sheet 24 with a solid, dry coating. The amount of this dry coating is determined by conventional means and this amount is noted.

For example, a number of discs having a surface area of 4 square inches on one side are punched from sheet 24 having the dry coating thereon. Each disc is carefully weighed, then stripped of the dry coating, either mechanically, chemically or electrochemically, and carefully weighed again. The average of the differences in weight of each disc is the weight of dry coating per 4 square inches on sheet 24. Repeating the above procedure, including the beta gage reading and dry film weight determination, two or three times for each thickness of film 16 provides an accurate average of beta gage reading and dry film weight.

The thickness of films 14 and 16 is varied, as by adjusting the spacing between rollers 11 and 15, and the procedure again repeated until sufficient data is obtained to plot beta gage readings versus dry film weights. The thickness or amount of coating on sheet 24 varies directly with the thickness of the film 16.

FIGURE 2 illustrates such a plot for the application to a steel sheet of a coating comprising polymerized petroleum hydrocarbon resins of high iodine number (Velsicol resins) and a mixture of drying oils, dissolved in an aromatic hydrocarbon solvent to give a viscosity of 62 seconds Canco cup. In actuality, when measuring the thickness of a wet film on a solid support, the quantity of back-scattered radiation reaching the ionization chamber 21 decreases as the thickness of the film being measured increases. However, the meter 23 illustrated in the drawing is arranged such as by reversing the electrical leads thereto to give the line shown in FIG. 2 a positive slope, i.e. as the measured film thickness increases, the readings on the meter increase. This arrangement is merely a matter of choice and can be changed as desired.

During subsequent coating operations using this type of resin coating, the amount of coating being applied to the sheet or strip can be quickly and accurately determined merely by comparing the reading on the meter 23 of the beta gage 17 with the previously obtained plot. If desired, after obtaining the plot, the meter 23 can be calibrated to read directly in dry film coating weights, thereby obviating further reference to the plot.

Referring to the preferred or exemplary apparatus of the present invention shown in FIG. 1, the bath 13 consists of a body of liquid coating 25 contained in a tank or reservoir 26 supported in a suitable manner (not shown). Rollers 11, 12 and 15 are mounted on and rotated in synchronism by shafts 27, 28 and 29 respectively in any well known manner (not shown). Shafts 27, 28 and 29 are positioned in spaced, parallel relation so that roller 11 is closely spaced lengthwise on one side from roller 12 and on the other side from roller 15. Roller 12 rotates in a counter-clockwise direction with a portion of its periphery submerged in coating liquid 25 thereby picking up on its unsubmerged peripheral surface a film 30 of liquid coating 25. With the rotation of roller 12, film 30 is carried around in a counterclockwise direction to the adjacent position of rollers 12 and 11, whereupon a portion of film 30 is transferred to roller 11 and the remainder returns to the body of liquid coating 25. The transferred portion is film 10.

Roller 11, rotating in a clockwise direction, carries film 10 therewith to the adjacent position of rollers 11 and 15 whereupon the portion 14 of film 10 is transferred to the peripheral surface of roller 15 rotating in a counterclockwise direction. The remaining portion 16 of film 10 continues on around in a clockwise direction with the rotation of roller 11 and merges with the film 30 where film 30 contacts roller 11.

Intermediate the line of divergence of film 10 into films 14 and 16 and merger of film 16 with film 30, the beta gage 17 is mounted by a suitable bracket or other means (not shown). In the exemplary embodiment illustrated, the beta gage 17 is mounted vertically over roller 11 and film 16. However, beta gage 17 can be mounted adjacent other portions of roller 11 and film 16.

A commercially available beta gage to measure the intensity of back-scattered beta radiation is a complete unit comprising a beta head consisting of the radioactive source 19 and the ionization chamber 21. The beta head is connected by suitable wiring to the current amplifier 22 and the meter 23. In the drawing, the size of the beta gage is greatly exaggerated for the purpose of clarity. In actuality, the beta gage unit is relatively small compared with the size of a roller coating machine.

The distance radioactive source 19 is spaced from the surface of film 16, is critical and depends upon the radioactive source used. The source of radioactive material 19 is constructed with suitably disposed shielding to permit radiation of beta particles in a direction angularly away from the face or opening of the ionization chamber 21 and is mounted a fixed distance in front of the ionization chamber. The face or opening of the chamber 21 points in the direction of the radiation but is shielded from direct radiation. As the radioactive source 19 and chamber 21 are moved in unison toward film 16, starting from a relatively far distance away, e.g. 6 inches or more, the intensity or quantity of back-scattered radiation collected in the ionization chamber 21 will increase sharply until a distance between film 16 and radioactive source 19 is reached where many of the beta rays are back-scattered into the source instead of into the ionization chamber. Thereafter, as source 19 and chambers 21 continue to move toward film 16 the quantity of back-scattered beta rays collected in the ionization chamber 21 will decrease rapidly. The optimum spacing of radiation source 19 from film 16 is that distance where the quantity of back-scattered beta rays collected in the chamber 21 is at a maximum so that slight variations in the spacing will not greatly affect the quantity of back-scattered radiation collected in the chamber 21. This distance can be readily determined by those skilled in the art for any particular radioactive source use. Using strontium 90 as the source of beta rays in the preferred or exemplary embodiment of the instant invention, the optimum spacing is about 5/8 inch, plus or minus 1/32 inch.

By means of a suitable conveyor such as feed dogs 31 carried on an endless chain 32 driven by a sprocket 33 rotating on a shaft 34, the steel sheet 24 is fed onto a table 35 and into the bite between applicator roller 15 and a back-up or scraper roller 36. Shaft 34 is driven from any suitable source of power (not shown). Although only a single sheet 24 is shown in the drawing, the conveyor apparatus is designed to feed a sequence of sheets in timed, processional order to the bite between rollers 15 and 36. Due to the rotation of rollers 15 and 36, sheet 24 is disengaged from feed dogs 31 and propelled through the bite between the rollers.

As the sheet 24 passes between rollers 15 and 36, at least a part of the film 14 on the peripheral surface of applicator roller 15 is applied or deposited onto the upper surface of the sheet 24. Previous calibration of the meter 23 of the beta gage 17, as described hereinbefore, enables the operator of the coating machine to tell by visual inspection of the meter the amount of coating being applied to the sheet 24. If this amount does not meet the prescribed schedule of coating weights to be applied to the sheet 24, the coating machine can be adjusted immediately to correct the error before a large number of sheets are improperly coated.

The momentum imparted to sheet 24 by the rollers 15, 36 as it passes therebetween propels the sheet against an upstanding, stop member 37 along the edge of table 35 remote from chain 32. Upon striking stop 37, sheet 24 drops into a depression or channel 38 in table 35. By means of a suitable conveyor such as feed dogs 39 carried on endless chains 40 driven by sprockets 41, the coated sheet 24 is removed from table 35, in a direction transverse thereto along the support rails 42, to a suitable place of deposit or subsequent operation, such as drying in an oven (not shown). The sprockets 41 are mounted on a shaft 43 driven from any suitable source of power (not shown).

For the operability of the present invention, it is necessary that the atomic numbers of the atoms composing the coating and of the atoms composing the roller supporting the film of coating be substantially different. It is for this reason that, when measuring the amount of an organic coating consisting essentially of atoms of carbon and hydrogen, the determination cannot be made using the back-scatter technique on the applicator roller composed of an organic substance also consisting essentially of atoms of carbon and hydrogen. However, the atomic number of iron, the principal atomic ingredient of the steel transfer roller, does differ sufficiently from the atomic numbers of carbon and hydrogen to enable determination of the thickness of an organic film thereon. Further, the instant invention is applicable to the determination of the thickness of a film of any liquid material being applied to any appropriate substrate by providing a film supporting transfer roller composed of atoms having a widely different atomic number from the atoms of the film.

For example, if a layer of molten tin or lead were being applied to a steel sheet by roller coating the molten metal onto the sheet, beta gage readings to determine coating thickness could not be made directly on the coated sheet because of the random magnetic fields existing therein mentioned before. However, since the atomic numbers of tin is 50 and that of lead is 82, determination by means of a beta gage of the thickness of a film of lead or tin could be made on a steel transfer roller consisting essentially of iron having an atomic number of 26, which roller is essentially free of random magnetic fields. Further, in the application of a layer of an organic coating to a paper surface, beta gage back-scatter readings to determine coating thickness could not be made directly on the coated paper because both the paper and coating are organic substances consisting essentially of atoms of carbon and hydrogen. However, by means of the instant invention such coating thickness could be obtained by taking thickness measurements on a steel or other metal transfer roller having a film of the coating thereon.

The proportionality between the film thickness on the transfer rollers and the thickness of the coating deposited on the sheet or strip is completely unexpected. This is especially true of the proportionality between the thickness of the film 16 remaining on the roller 11 and film 14 applied to the sheet 24. For the sake of convenience and since best results are obtained thereby, it is preferred to take the beta gage readings and measurements on film 16 as shown in FIG. 1.

For the preferred or exemplary embodiment of the instant invention disclosed hereinbefore, any medium or high energy source of beta radiation may be used. Example of such beta radiation sources are strontium 90-yttrium 90, thallium 204 or cesium 137. Strontium 90-yttrium 90 is written as such because strontium 90 rapidly decays to yttrium 90 from which beta rays are emitted. However, any number of beta radiation sources may be used depending upon the type and composition of the coating being measured and the order of magnitude of its thickness. Also, a radiation source having a reasonably long half-life is used so that rapid loss in energy and consequent frequent recalibration thereof are obviated. A radioactive source having a half-life of at least two years is preferred.

The energy of a portion of the beta particles emitted from the source must be sufficient for these particles to pass readily and completely through the wet coating both upon incidence and reflection. Some of the particles will have sufficient energy to penetrate some distance into the body of the supporting transfer roller. However, none of the emitted beta particles can have sufficient energy to pass completely through the supporting roller. In other words, the thickness of the film being measured must represent less than infinite thickness to the transmission and back-scattering of a portion of the beta particles radiated from the particular source; but the thickness of the supporting transfer roller must represent infinite thickness to the transmission, and consequently the back-scattering also, beta rays. The reason for these requirements is obvious. If the thickness of the supporting transfer roller represents less than infinite thickness to the transmission of beta rays, the quantity of beta rays back-scattered through the roller, if any, will be a measure of the combined thickness of the roller and the organic film thereon, rather than of just the film, as is desired. On the other hand, if the thickness of the film represents infinite thickness to all of the beta rays, either to their transmission or their reflection, increases in thickness of the film will have no effect on the quantity of back-scattered beta rays.

Since beta radiation from a radioactive source is a random but statistically measurable quantity, rapid but relatively minor fluctuations will occur on the visual inspection device or meter 23. All other variables being constant, these fluctuations average to a substantially fixed value over a period of time, the longer the time the more accurate the average. An averaging time of at least 7 seconds and preferably about 15 seconds has been found to give accurate results. This means that values given on meter 23 at any one instant are without significance; and that for proper reading of the meter 23, it must be viewed continuously for the necessary period of time, e.g. 15 seconds, to ascertain the average value or mid-point of the fluctuations on the meter or other visual inspection device. This average value indicates the amount of coating being applied to the sheets passing through the coating machine. In actual operation, this viewing need be done only periodically, e.g. every 15 or 30 minutes. If the beta gage is connected to the adjustment controls of the coating machine by suitable electronic and electrical devices, these devices can automatically take readings from the beta gage and if necessary, can make adjustments to the machine thereby obviating the necessity of periodic visual inspection.

The ionization chamber type of detector for determining the quantity of back-scattered radiation is preferred because it operates on a moderate amount of input voltage, i.e. about 250 to 300 volts direct current. However, other detectors, such as a Geiger-Muller counter or the like may be used if desired.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A non-destructive method of determining the amount of coating being applied to a moving surface comprising the steps of, advancing said surface along a predetermined path of travel, providing adjacent such path of travel a substantially cylindrical element having a wet film of said coating thereon, the atoms essentially composing said element having an atomic number substantially different from the atoms essentially composing said film, applying to said surface as a coating therefor a portion of said film from said element, impinging during said application a stream of beta-rays emitted from a radioactive source disposed adjacent said element and remote from said surface against another portion of said film on said element, said other portion having a finite thickness with respect to the transmission and reflection of a portion of said beta rays and said element having an infinite thickness with respect to beta-ray transmission, measuring the quantity of beta-rays back-scattered from said element and said other portion, and indicating said quantity for visual inspection, said quantity of back-scattered rays being proportional to the amount of coating being applied to said moving surface.

2. A method of determining the amount of an organic coating being applied to a moving surface comprising the steps of, advancing said surface along a predetermined path of travel, providing adjacent said path of travel a substantially cylindrical applicator element and contiguous thereto a substantially cylindrical metal transfer element having a wet film of said coating thereon, said film being essentially composed of atoms having an atomic number substantially different from the atoms essentially composing said transfer element, transferring from said transfer element directly to said applicator element a thin portion of said wet film while retaining on said transfer element a thin portion of said wet film, applying to said moving surface said transferred thin portion, impinging during said application a stream of beta-rays emitted from a radioactive source disposed adjacent said transfer element and remote from said sheet against said retained thin portion, said emitted beta-rays having medium to high energy whereby said retained thin portion presents finite thickness to the transmission and back-scattering of a portion of said emitted beta-rays and said transfer element presents infinite thickness to the transmission of said emitted beta-rays, measuring the quantity of beta-rays back-scattered from said transfer element and said retained portion, averaging said quantity of back-scattered rays, and indicating said averaged quantity for visual inspection, said quantity being proportional to the amount of said organic coating being applied to said moving surface.

3. The method set forth in claim 2 wherein the quantity of back-scattered radiation is averaged over an interval of at least 7 seconds.

4. An apparatus for measuring the amount of coating being applied to a moving flat surface comprising, coating means for applying a wet coating to said surface, at least a portion of said coating means being substantially cylindrical and having on the surface thereof a thin film of said wet coating, the atoms essentially composing said cylindrical portion having an atomic number substantially different from the atoms essentially composing said wet film, means for moving said flat surface and coating means relative to each other, radiation means adjacent said thin wet film on said cylindrical portion and remote from said flat surface for directing a stream of beta-rays against and through said thin wet film, said thin wet film presenting essentially a finite thickness to the transmission and reflection of a portion of said beta rays and said cylindrical element presenting an infinite thickness to transmission of said beta rays, detector means for detecting a quantity of beta-rays back-scattered from said cylindrical portion and said thin wet film thereon, said quantity being proportional to the amount of coating being applied to said flat surface, and visual inspection means coupled with said detector means for visually indicating said quantity.

5. An apparatus for measuring the amount of a coating being applied to a moving flat surface comprising, means for advancing said surface along a predetermined path of travel, substantially cylindrical applicator means adjacent said path of travel for applying said coating to said moving surface, substantially cylindrical transfer means contiguous said applicator means for transferring a wet coating from a reservoir thereof to said applicator means, said wet coating being in the form of a wet film on said transfer means and being essentially composed of atoms having an atomic number substantially different from the atoms essentially composing said transfer means, a beta-ray emitting radioactive source adjacent said transfer means and the film thereon and remote from said surface for directing a stream of beta-rays against and through said film and into but not through said transfer means, detector means disposed on the side of said source opposite said transfer means for detecting a quantity of beta-rays back-scattered from said transfer means and the wet film thereon, means for averaging said back-scattered rays over a time interval of at least 7 seconds, said averaged quantity being proportional to the amount of coating being applied to said sheet, and detector means coupled with said detector means for visually indicating said quantity.

6. The apparatus set forth in claim 5 wherein said applicator means and said coating are composed of organic material.

7. The apparatus set forth in claim 6 wherein said transfer means is metal.

8. The apparatus set forth in claim 7 wherein said applicator means and said transfer means are rollers.

9. The apparatus set forth in claim 5 wherein said detector means is an ionization chamber.

10. The apparatus set forth in claim 5 wherein said radioactive source is strontium 90-yttrium 90.

References Cited in the file of this patent

UNITED STATES PATENTS

| | | |
|---|---|---|
| 2,750,986 | Russell | June 19, 1956 |
| 2,793,345 | Hags | May 21, 1957 |
| 2,859,349 | Bradley | Nov. 4, 1958 |

OTHER REFERENCES

Development in Thickness Gauges and Allied Instruments, by J. L. Putman, from Proceedings of the International Conference on the Peaceful Uses of Atomic Energy, vol. 15, pages 119–123, August 1955.